(12) United States Patent
Hayes

(10) Patent No.: US 11,148,587 B2
(45) Date of Patent: Oct. 19, 2021

(54) APPARATUS FOR BRAKE AND CAUTION LIGHTING

(71) Applicant: Christopher Hayes, St. Petersburg, FL (US)

(72) Inventor: Christopher Hayes, St. Petersburg, FL (US)

( * ) Notice: Subject to any disclaimer, the term of this patent is extended or adjusted under 35 U.S.C. 154(b) by 244 days.

(21) Appl. No.: 16/544,948

(22) Filed: Aug. 20, 2019

(65) Prior Publication Data
US 2021/0053485 A1 Feb. 25, 2021

(51) Int. Cl.
*B60Q 1/44* (2006.01)
*B60Q 1/52* (2006.01)

(52) U.S. Cl.
CPC ............. *B60Q 1/447* (2013.01); *B60Q 1/444* (2013.01); *B60Q 1/525* (2013.01)

(58) Field of Classification Search
CPC ......... B60Q 1/447; B60Q 1/144; B60Q 1/525
USPC ....... 340/467, 468, 464, 479, 438, 439, 901, 340/903; 362/487, 496, 541, 167; 180/168, 271
See application file for complete search history.

(56) References Cited

U.S. PATENT DOCUMENTS

| | | | |
|---|---|---|---|
| 6,130,609 A * | 10/2000 | Huang | B60Q 1/445 200/61.45 R |
| 7,330,106 B2 * | 2/2008 | Paulson | B60Q 1/447 340/439 |
| 2016/0121786 A1 * | 5/2016 | Gasper | B60Q 1/445 362/464 |

\* cited by examiner

*Primary Examiner* — Julie B Lieu
(74) *Attorney, Agent, or Firm* — Justin Luby

(57) ABSTRACT

The present disclosure pertains to a light system for mounting to an automobile that alerts surrounding vehicles to emergency conditions on the automobile without the necessity of establishing electrical communication with the control system of the automobile. The light system utilizes a movable contactor that serves to activate and deactivate the light when the light system is tilted.

2 Claims, 6 Drawing Sheets

APPARATUS FOR BRAKE AND CAUTION LIGHTING

CROSS-REFERENCE TO RELATED APPLICATIONS

N/A

FIELD OF THE INVENTION

This invention relates generally to signals and in particular to brake light signals of the type deployed on vehicles to indicate stopping conditions. Most particularly, the present invention relates to a wireless auxiliary system wherein the brake lights will be activated through the decelerating momentum of the vehicle without any input signals from the vehicle.

BACKGROUND

Brake lights are an important safety system in vehicles, particularly motor vehicles. Such lights indicate the operating condition of the vehicle and warn following drivers of upcoming stops. It is generally mandated by law that vehicles operating on public roadways be equipped with adequate auxiliary light systems.

Hazards can occur when a first vehicle is towing a trailer or a second vehicle because the towed vehicle tends to obscure the taillights of that first vehicle. In such situations, safety as well as law requires that the towed vehicle also be provided with adequate taillight systems. Toward this end, many trailers or regularly towed vehicles are equipped with wired-in taillight systems which include a jack or similar connector adapted to interface with the electrical system of the towing vehicle so as to energize the towed vehicle's lighting system in synchrony therewith. While such systems are in very widespread use, they do present problems insofar as the connector jacks tend to corrode or break off and wiring of the auxiliary taillight system tends to fail, often while the vehicle is being towed. Additionally, in addition to damage to vehicles disabling the auxiliary light system, some vehicles are simply not equipped with an electric wiring system or computer module, which may include go-carts, mopeds, bicycles, and the like.

Greater difficulties are encountered when a first vehicle is towing a second in an emergency situation because connector jacks are generally not found on most motor vehicles and establishing an interconnection between the taillight systems of the respective vehicles entails expenditure of time and effort. Furthermore, in an emergency situation it is frequently found that the vehicle to be towed has sustained damage to its taillight system precluding any such interconnection.

Difficulties are also occasioned by failures of preinstalled taillight systems on trailers and the like due to broken connections, blown fuses, damaged bulbs and so forth. Frequently such damage occurs on the road remote from a repair facility and such failure is most significant under conditions of darkness or limited visibility which further complicate repair of the taillight system.

The foregoing problems could be simply and easily obviated if there were available a system for providing taillight function to automobiles, trailers, or other towed vehicles, which system does not necessitate extensive electrical connection to the towed vehicle. It is further desired that such system be readily adaptable to be used in conjunction with a variety of vehicles and not be dependent upon any electrical or mechanical components thereof for its function.

SUMMARY

By the use of the present invention, functions of the light system, may be provided to any vehicle, both a vehicle with an engine and a vehicle towed by a vehicle with an engine, without the necessity of establishing electrical communication with the control system of the engined vehicle.

The auxiliary light system of the current invention is completely self-contained, requiring no inputs from the engine vehicle to activate and deactivate. The auxiliary light system comprises a housing, a plurality of lights, a power supply, a contact switch and a movable contactor. Contained inside the housing, the power supply is wired to the plurality of lights with the contact switch capable of completing or interrupting the circuit between the power supply is wired to the plurality of lights. The movable contactor serves to activate and deactivate the switch when the contactor is in physical contact with the contact switch.

The movable contactor is a roller element with a ring around the roller element. The inside of the housing has a slot in the housing which serves to guide the movable contactor.

The auxiliary light system is attached by the housing to the vehicle in need of a auxiliary light system. When installed on the vehicle, the auxiliary light system is oriented such that the contact switch is on the side of the auxiliary light system which faces the front of the vehicle. When the vehicle accelerates from the stopped position, the vehicles momentum will cause the movable contactor to disconnect from the contact switch, opening the circuit, and disabling the light. As the vehicle remains in and accelerating state or constant velocity, the movable contactor will remain physically separated from the contact switch. When the vehicle decelerates, momentum will cause the movable contactor to engage with the contactor switch, completing the switch circuit, and enable the light.

Because the afore-described auxiliary light is completely self-contained, the light can easily be installed and removed from a vehicle, as needed. Also, due to the simplicity of the invention, the light system is an affordable solution that can be stowed in a vehicle emergency kit. And finally, due to the ease of installation, the device can be used with nearly any type of vehicle imaginable.

DETAILED DESCRIPTION OF THE INVENTION AND PREFERRED EMBODIMENT

Figure 1:
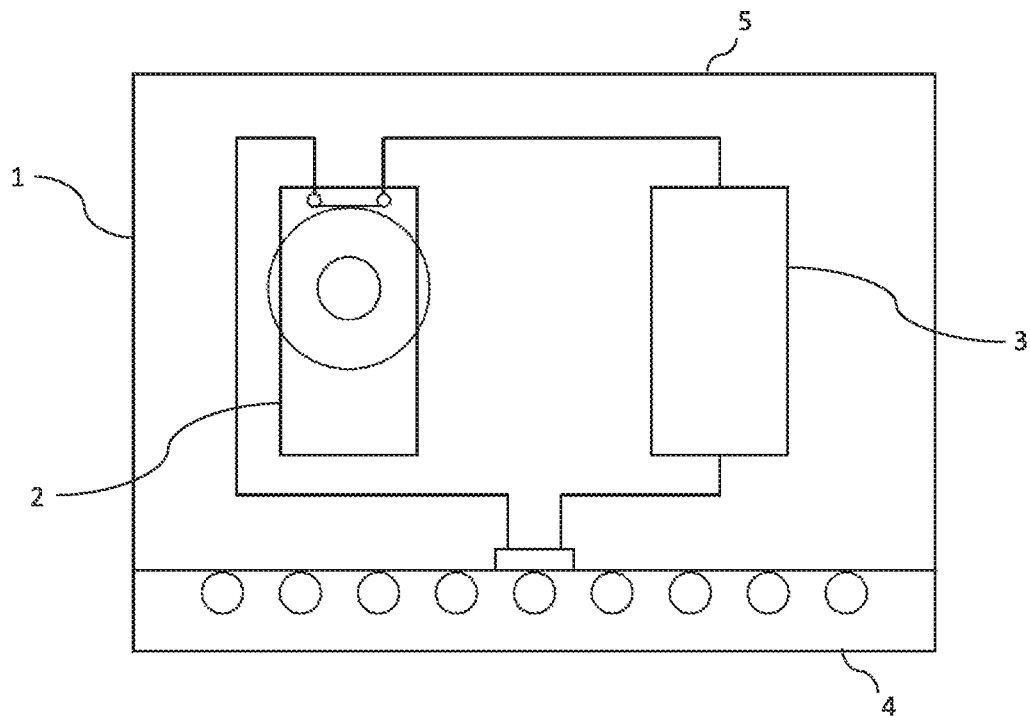
FIG. 1 is a wiring diagram depicting the light system of the current invention with the contact switch closed.
Figure 2:
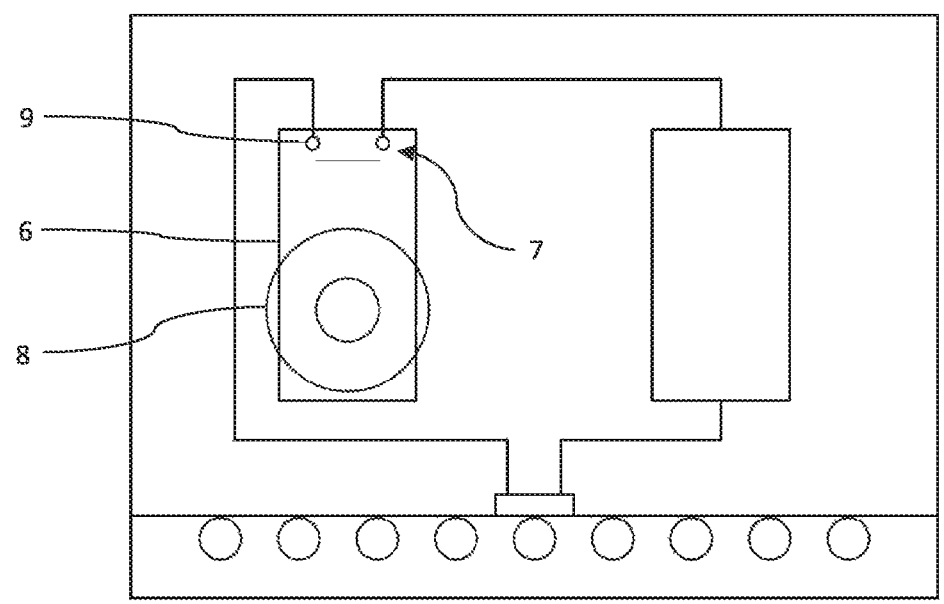
FIG. 2 is a wiring diagram depicting the light system of the current invention with the contact switch open.

As depicted in FIGS. 1 & 2, the primary components of the auxiliary light system of the current invention comprises a circuit housing 1, a momentum activated switch 2, a power supply 3, a light 4, and wiring 5. The system is wired such that the power supply 3 supplies power to activate the light 4 through the wiring 5. The momentum activated switch 2 is installed in the circuit, and when the momentum switch 2 is activated, the light 4 will illuminate, and when the momentum switch 2 is deactivated, the light 4 will de-luminate.

The power supply 3 should be selected such that the output from the power supply 3 is aligned with the required input power for the light 4. In the preferred embodiment the light 4 is an LED light, which requires a smaller power supply 3, keeping the weight and cost of the auxiliary light system lower.

Figure 3:
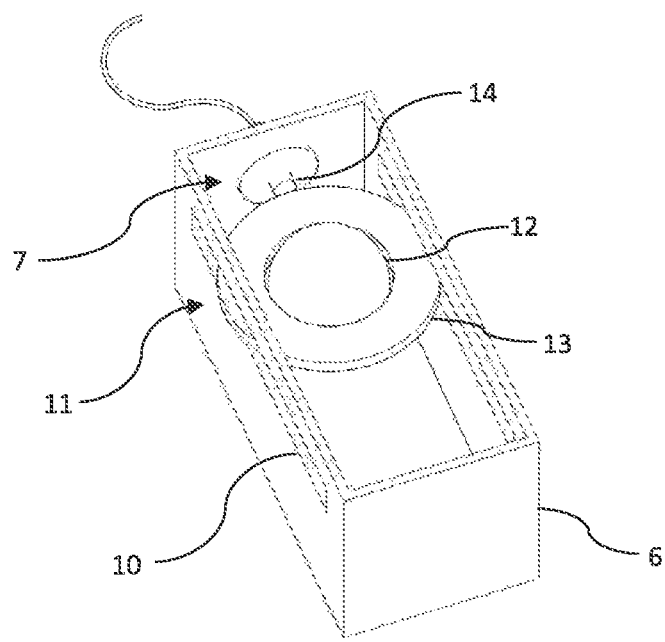
FIG. 3 is a perspective view of a first embodiment of the contactor switch of the present invention with the roller unit engaged with the push button switch with the top of the switch removed.
Figure 4:
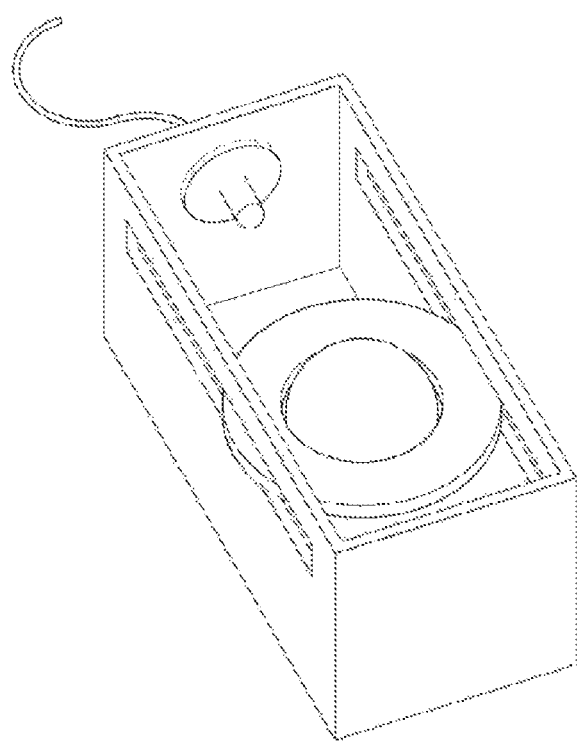
FIG. 4 is a perspective view of a first embodiment of the contactor switch of the present invention the roller unit disengaged with the push button switch with the top of the switch removed.
Figure 5:
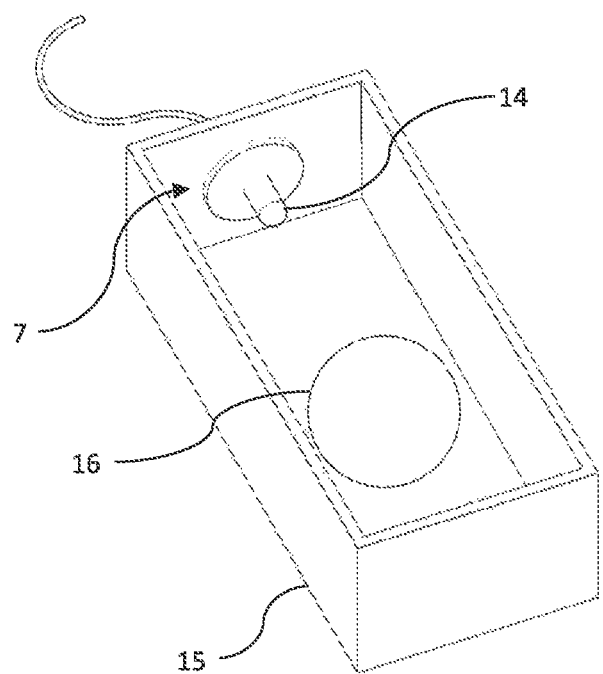
FIG. 5 is a perspective view of a second embodiment of the contactor switch of the present invention with the top of the switch removed.

As depicted in FIGS. 3, 4, & 5, the momentum activated switch 2 is comprised of a switch housing 6, a push button switch 7, a roller unit 8, and wiring connections 9. The push button switch 7 is a momentary or non-latching switch which causes a temporary change in the state of an electrical circuit only while the switch 7 is physically actuated. An automatic mechanism (i.e. a spring) returns the switch to its default position immediately afterwards, restoring the initial circuit condition. In the preferred embodiment the push button switch 7 is push-to-make switch, also known as a Normally Open (NO) Switch, which allows electricity to flow between its two contacts when the button is depressed, and the light 4 illuminates. When the button is released, the circuit is broken and the light 4 de-luminates.

In a first embodiment, depicted in FIGS. 3 & 4, an auxiliary light system which would be used for signaling a braking situation, the switch housing 6 is a hollow rectangle and has a pair of slots 10 in two long sides of the switch housing 6. In this embodiment the roller unit 8 is a roller ball transfer bearing 11 with a sphere 12 in the center of the unit and a ring 13 around the sphere. The ring 13 fits in the pair of slots 10 in two long sides of the switch housing 6 and guides the roller ball transfer bearing 11 while the sphere 12 is free to rotate, allowing the roller ball transfer bearing 11 to move back and forth through the inside of the switch housing 6. The push button switch 7 is located at one end of the switch housing 6, and oriented such that the button 14 is on the inside of the switch housing 6.

When the switch housing 6 is tilted so that the end of the switch housing 6 with the push button switch 7 is below the end of the switch housing 6 without the switch, the roller ball transfer bearing 11 will roll toward the push button 14, and engage and depress the push button 14, completing the circuit. When the switch housing 6 is tilted so that the end of the switch housing 6 with the push button switch 7 is above the end on the housing without the switch, the roller ball transfer bearing 11 will roll away from the push button 14, and disengage the push button switch 7, breaking the circuit.

While a Normally Open (NO) push button switch 7 is the preferred embodiment of the present invention due to the cost and simplicity, there are a number of switches which could provide the same function, which would be obvious to those skilled in the art, including but not limited to capacitive switches and proximity switches.

In a second embodiment, depicted in FIG. 5, an auxiliary light which would be used for signaling a braking situation, the switch housing 15 is rectangular. In this embodiment the roller unit is a sphere 16. The diameter of the sphere 16 is approximately the same distance as the distance between two long sides of the switch housing 15, allowing the sphere 16 to move back and forth through the inside of the rectangular switch housing 15 without the need for any guides. The push button switch 7 is located at one end of the rectangular switch housing 15 and oriented such that the button 14 is on the inside of the housing.

Figure 6:
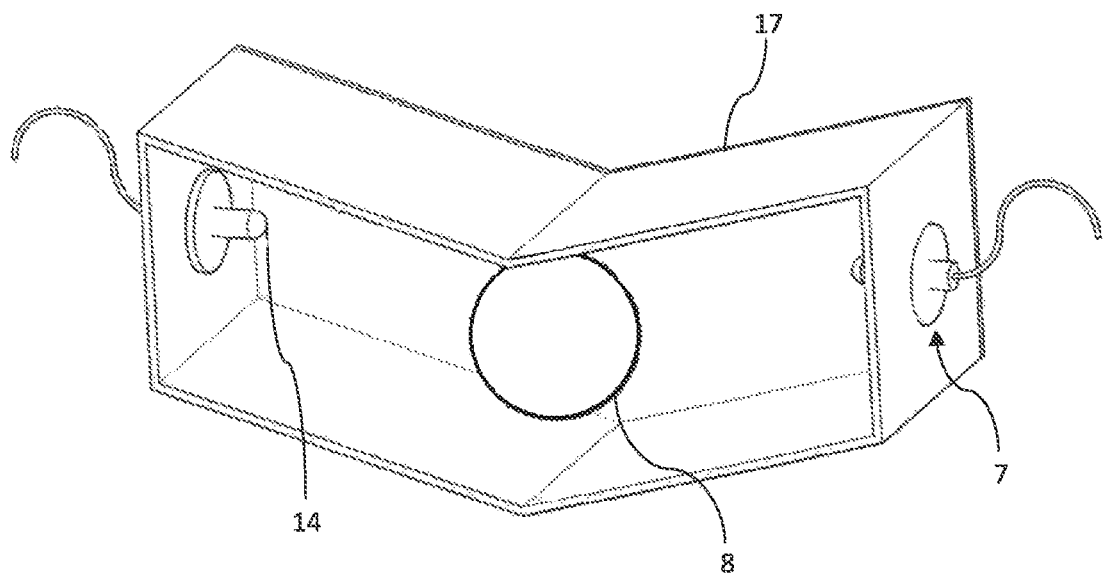
FIG. 6 is a perspective view of a third embodiment of the contactor switch of the present invention with the one side of the switch removed.
Figure 7:
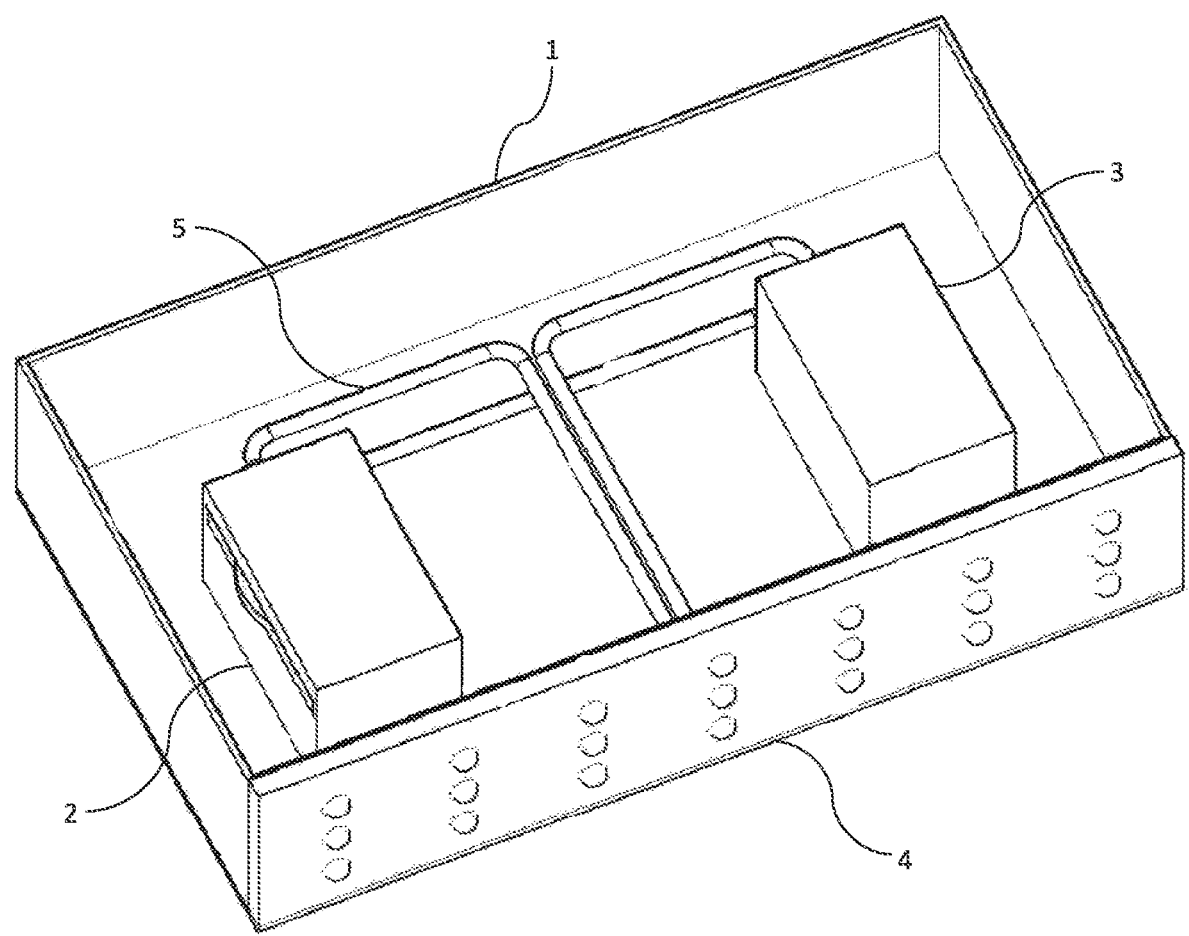
FIG. 7 is a perspective view of the light system of the current invention the top of the circuit housing removed.

In a third embodiment, depicted in FIG. 6, an auxiliary light which would be used for signaling an off-balanced load situation, the switch housing 17 is could have slots 10 and a roller bearing 8, like in the first embodiment, or no slots and a sphere 16 in the second embodiment, in this embodiment the housing 17 is a slight vee shape with the low point in the center, and either end of the housing slightly above the center point, creating slight upward angles of 3 to 10 degrees. Push button switches 7 are located at either end of the rectangular switch housing 17 and oriented such that the button 14 is on the inside of the housing 17. When the rectangular switch housing 17 is tilted either direction, in excess of the slight upward angles of 3 to 10 degrees, indicating a off-balance load, the roller unit 8 will roll toward the push button 14, and engage and depress the push button 14, completing the circuit.

Figure 8:
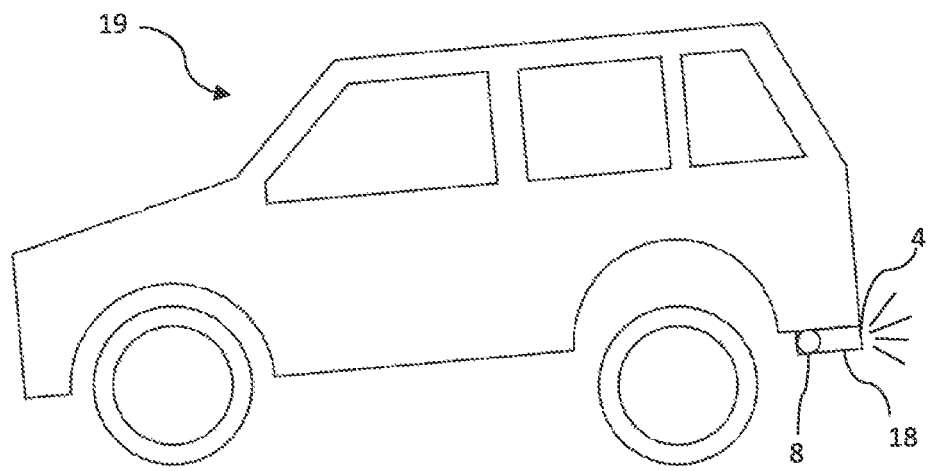
FIG. 8 is a diagram depicting the brake light system of the current invention installed on an automobile where the automobile is braking, and illuminating the light switch.
Figure 9:
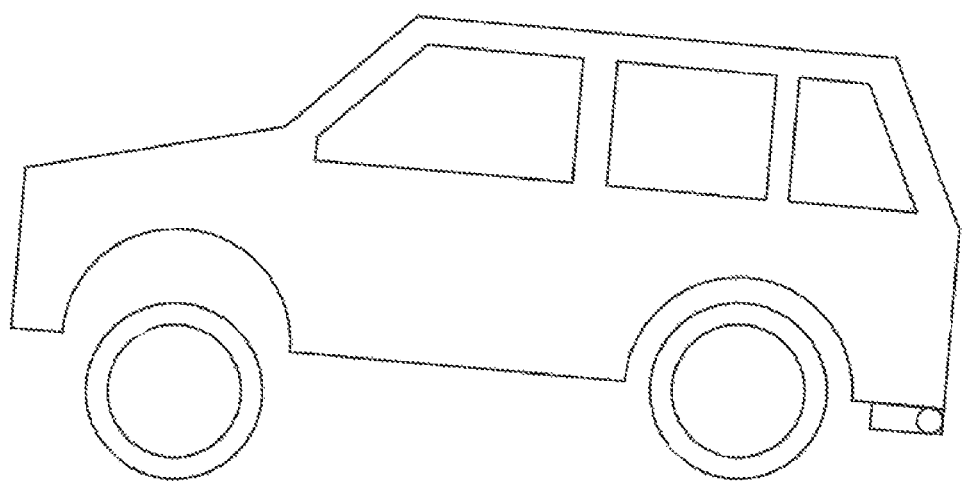
FIG. 9 is a diagram depicting the brake light system of the current invention installed on an automobile where the automobile is accelerating, and the light switch is deactivated.

As depicted in FIGS. 8 & 9, to use the auxiliary light of the current invention as a temporary brake light 18 on a vehicle 19 the light is configured such that the push button switch 7 is on the back side of the housing 6 and the light 4 is located on the front side of the housing. The temporary brake light 18 should be installed on the rear of the vehicle 19 nearly level with the ground, but at a very slight downward angle, 1 to 5 degrees, with the temporary brake light 18 sloped towards the ground. The slight downward angle prevents the roger unit 8 from activating the push button switch 7 when the vehicle 19 is not decelerating. When a vehicle 19 decelerates, the switch housing 6 will also decelerate with the vehicle 19, however, the roller unit 7 will continue its forward momentum, engaging with the push button 14. Additionally, the vehicle 19 will also make a slight nose dive, angling temporary brake light 18 downward, towards the push button switch 7, further propelling the roller unit 8 towards the push button 14.

As depicted in FIG. 9, when a vehicle 19 accelerates, the switch housing 6 will also accelerate with the vehicle 19, however, the roller unit 8 will not have the same momentum as the housing 6, ensuring the roller unit 8 does not engage with the push button 14. Additionally, the vehicle 19 will also make a slight nose up, angling the switch housing 6 upward, away from the push button switch 7, further propelling the roller unit 8 away from the push button 14.

Figure 10:
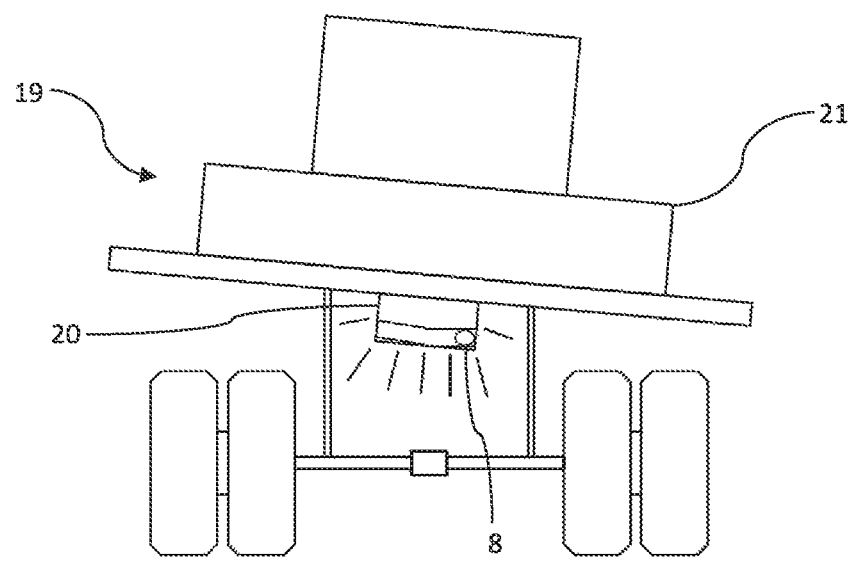
FIG. 10 is a diagram depicting the off-balance load light system of the current invention installed on a trailer where the load has become off-balanced, and illuminating the light switch.
Figure 11:
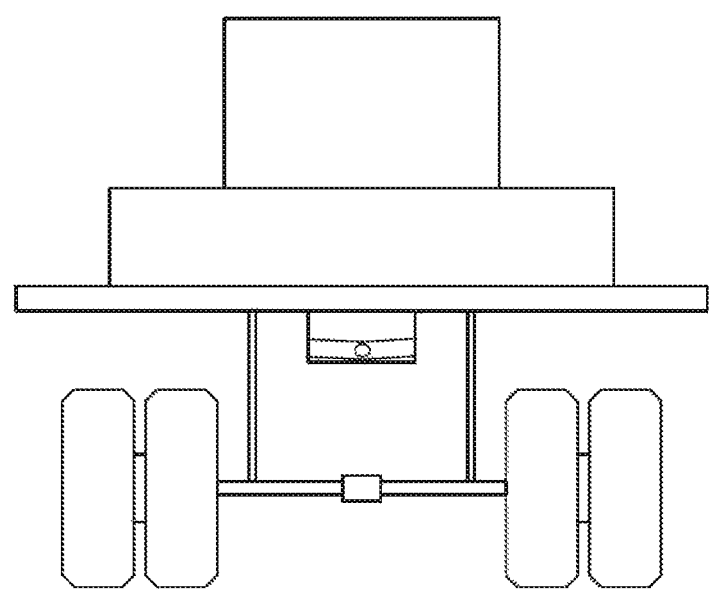
FIG. 11 is a diagram depicting the off-balance load light system of the current invention installed on a trailer where the load is balanced, and the light switch is deactivated.

As depicted in FIGS. 10 & 11, to use the auxiliary light or the current invention as an off-balance load indicator 20 the light is installed on vehicle load 21, level with the ground. If the load 21 of the vehicle 19 is to become unstable, the load 21 will tip to one side, causing the off-balance load indicator 20 to tip with the load 21 as well. If the load 21 tips to the point where it overcomes the upward angles of 5 to 25 degrees, the roller unit 8 will move to one side of the housing 6, engaging the push button switch 7.

It would be appreciated by those skilled in the art that various changes and modifications can be made to the illustrated embodiments without departing from the spirit of the present invention. All such modifications and changes are intended to be covered by the claims.

What is claimed is:

1. A method for signaling to a second vehicle that a load on a first vehicle is off balance, said method comprising;
   providing an auxiliary light comprises a light housing, a momentum activated switch, and a light;
   wherein said momentum activated switch further comprises of a vee shaped switch housing with a low center point in the center and two ends of the housing above the center point creating upward angles, a momentary switch located at each of the two ends of the housing, and a roller unit;
   wherein the auxiliary light is illuminated and de-luminated by the switch housing being oriented at various angles so that the roller unit contacts and separates from the momentary switches;
   wherein the auxiliary light is attached to the load located on the first vehicle at a first angular position where the load is balanced, wherein said first angular position orients the roller unit and the momentary switch such that the light is de-luminated;
   wherein when the load located on the first vehicle is off balance the auxiliary light is oriented in a second angular position that orients the roller unit and the momentary switch such that the light is illuminated.

2. The method for signaling to a second vehicle that a load on a first vehicle is off balance of claim 1 wherein the momentum activated switch housing further comprises a rectangular shape with two opposing sides of the rectangular shape having parallel slots and the roller unit comprising is a roller ball transfer bearing with a sphere in the center of the roller unit and a ring around the sphere that fits in the parallel slots.

\* \* \* \* \*